United States Patent
Wendte et al.

(10) Patent No.: US 7,240,626 B2
(45) Date of Patent: Jul. 10, 2007

(54) TANDEM GAUGE WHEEL ASSEMBLY FOR PLANTING UNIT

(75) Inventors: Keith W Wendte, Hinsdale, IL (US); Brian T Adams, Centralia, MO (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 11/561,573

(22) Filed: Nov. 20, 2006

(65) Prior Publication Data

US 2007/0089652 A1    Apr. 26, 2007

Related U.S. Application Data

(62) Division of application No. 10/759,309, filed on Jan. 16, 2004, now Pat. No. 7,191,715.

(51) Int. Cl.
*A01B 49/04* (2006.01)
*A01C 5/00* (2006.01)
*A01C 7/00* (2006.01)
*A01C 9/00* (2006.01)
*A01C 13/00* (2006.01)

(52) U.S. Cl. .......................... 111/136; 111/168; 111/900

(58) Field of Classification Search ........ 111/134–137, 111/59, 62, 190–196, 149, 157, 900, 163–169; 172/538
See application file for complete search history.

(56) References Cited

U.S. PATENT DOCUMENTS

| | | | |
|---|---|---|---|
| 1,021,379 A | 3/1912 | Schutt | |
| 1,392,732 A | 10/1921 | Zamstof | |
| 4,116,140 A | 9/1978 | Anderson et al. | |
| 4,273,057 A | 6/1981 | Pollard | |
| 4,333,534 A | 6/1982 | Swanson et al. | |
| 4,407,207 A | 10/1983 | Drayer | |
| 4,423,788 A | 1/1984 | Robinson et al. | |
| 4,450,779 A | 5/1984 | Bailey | |
| 4,539,921 A | 9/1985 | Morlock | |
| 4,726,517 A | 2/1988 | Smith et al. | |
| 4,964,351 A | 10/1990 | Elmenhorst | |
| 5,065,681 A | 11/1991 | Hadley | |
| 5,341,754 A | 8/1994 | Winterton | |
| 5,398,771 A | 3/1995 | Hormung et al. | |
| 5,507,351 A | 4/1996 | Martin | |
| 5,595,130 A | 1/1997 | Baugher et al. | |
| 5,724,903 A | 3/1998 | Yoder et al. | |
| 6,109,193 A | 8/2000 | Crabb et al. | |
| 6,389,999 B1 | 5/2002 | Duello | |
| 6,401,638 B1 | 6/2002 | Crabb et al. | |
| 6,640,732 B2 | 11/2003 | Prairie et al. | |
| 6,827,029 B1 | 12/2004 | Wendte | |
| 7,044,070 B2 | 5/2006 | Kasco | |
| 2003/0164125 A1 | 9/2003 | Paluch et al. | |
| 2005/0120929 A1 | 6/2005 | Friesen et al. | |

OTHER PUBLICATIONS

PSM 9000 Avant, Pneumatic (4 pages) from Brazil.

*Primary Examiner*—Christopher J. Novosad
(74) *Attorney, Agent, or Firm*—Rebecca Henkel

(57) ABSTRACT

A seed planting assembly is provided having a plurality of planting units supported by a tool bar, each of which being operable to form a seed trench in soil, plant seeds in the seed trench, and close the seed trench. The seed trench defines a depth that is achieved via a pair of gauge wheels. A press wheel assembly packs the trench after it has been seeded and closed. The planting assembly links the forward gauge wheels with the rear press wheel assembly for reciprocal motion to reduce the trench depth displacement when either a gauge wheel or a press wheel travels over an obstacle.

1 Claim, 10 Drawing Sheets

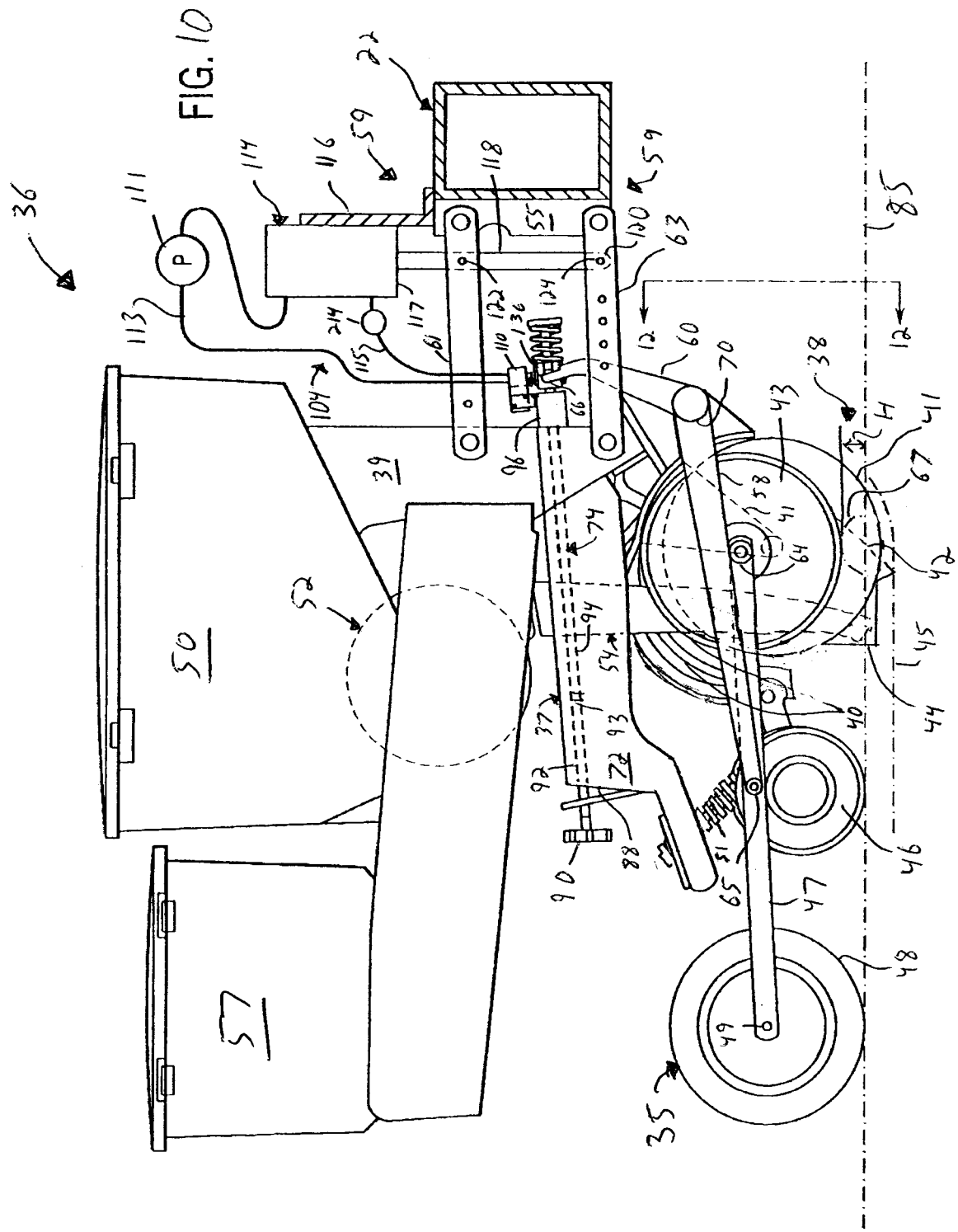

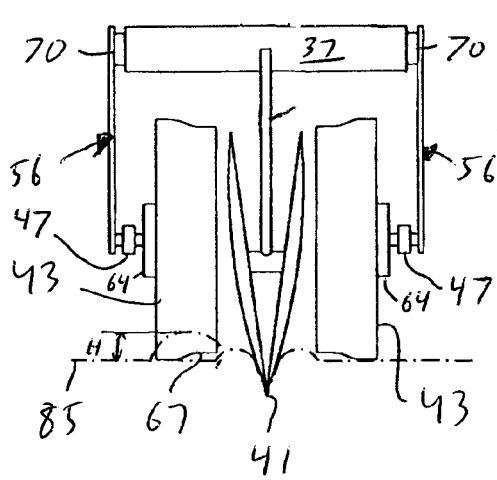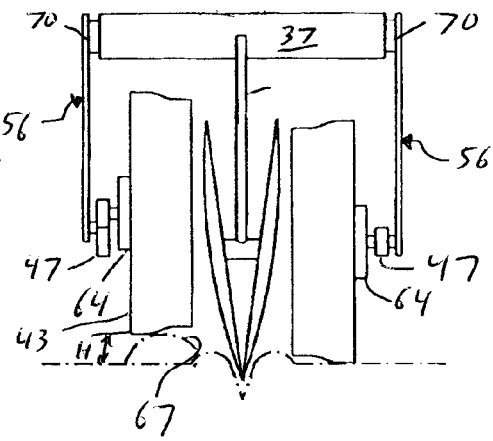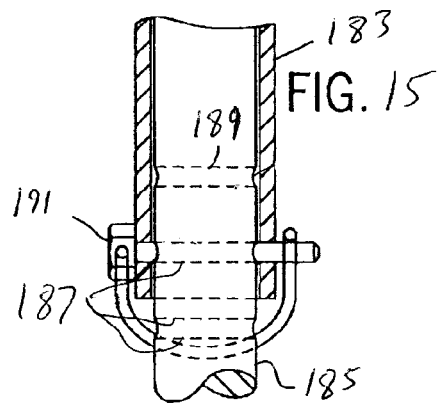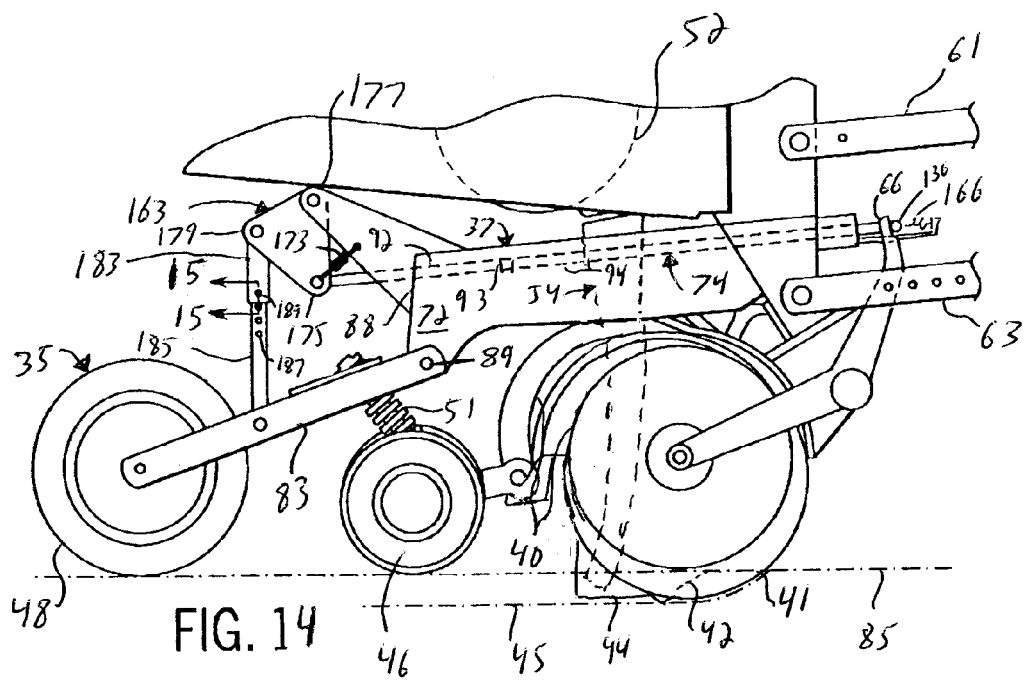

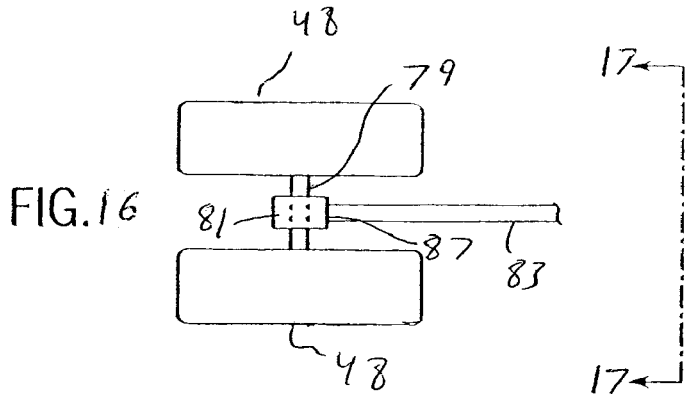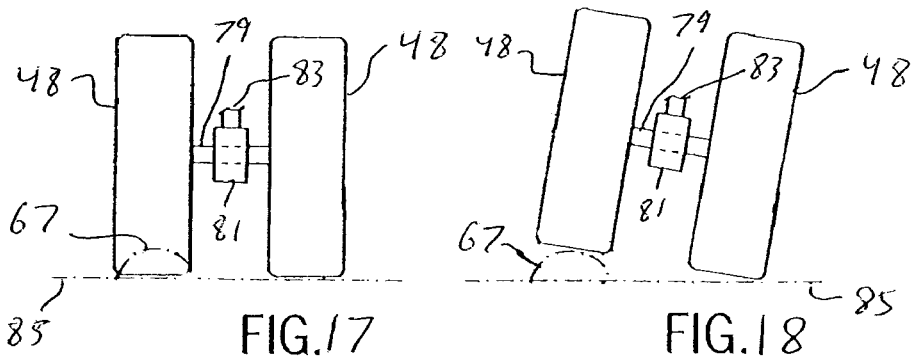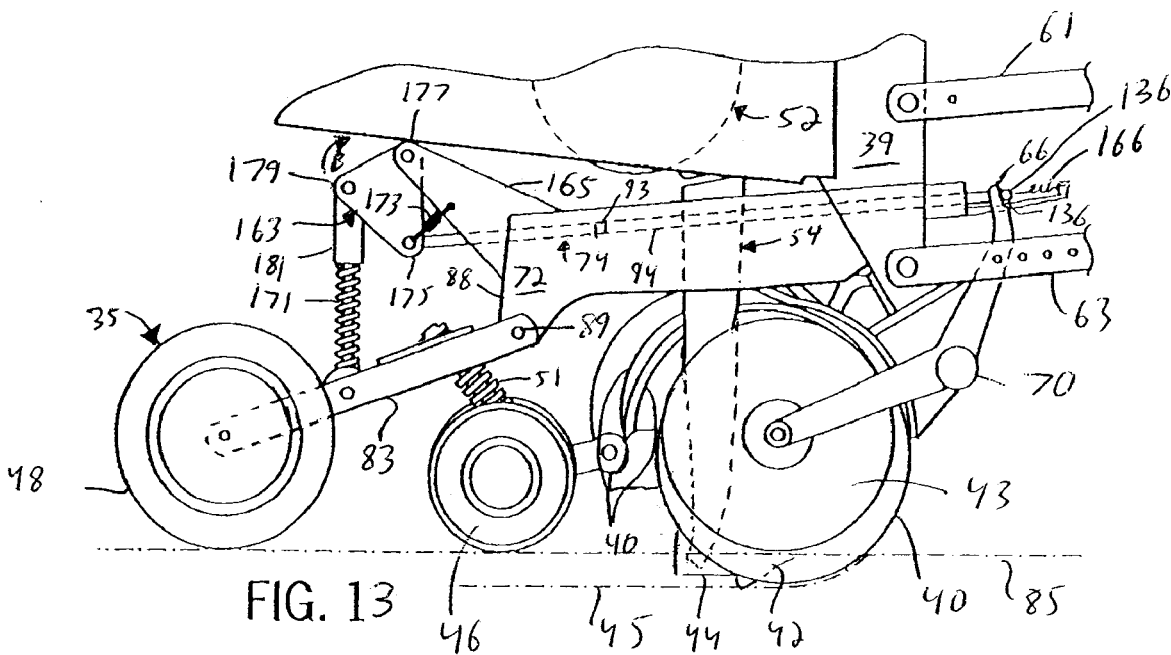

TANDEM GAUGE WHEEL ASSEMBLY FOR PLANTING UNIT

CROSS-REFERENCE TO RELATED APPLICATIONS

This Patent Application is a Divisional of, and claims priority to under 35 U.S.C. §120, U.S. patent application Ser. No. 10/759,309, filed on Jan. 16, 2004, entitled, "Tandem Gauge Wheel Assembly For Planting Unit" and having Keith W. Wendte as the Inventor, now U.S. Pat. No. 7,191,715. The full disclosure of U.S. patent application Ser. No. 10/759,309 is hereby fully incorporated by reference.

STATEMENT REGARDING FEDERALLY SPONSORED RESEARCH OR DEVELOPMENT

None

BACKGROUND OF THE INVENTION

The present invention relates to seed planting assemblies in general, and in particular relates to a method and apparatus for maintaining seed trench depth during operation of a seed planting assembly.

Seed planting units generally include a laterally extending tool bar that supports a plurality of parallel planting units (also known as row units). The tool bar is typically coupled to a tractor or like vehicle suitable for towing the planting assembly along a field that is to be seeded to a crop. Each planting unit includes a device for opening a seed trench in the ground as the tractor draws the tool bar across a field to be seeded.

Each planting unit further includes a seed meter to dispense seeds at a controlled rate into a seed trench as the meter is advanced above and along the seed trench during operation. Generally, seeds are delivered to the metering assembly from a seed hopper located on the planting unit or, alternatively, from a smaller container fed from a centralized large hopper used to feed all or a portion of the planting units. Each planting unit further includes a closing assembly that moves soil at the sides of the seed trench to close the seed trench over the planted seeds. Adjacent planting units are laterally spaced a sufficient distance to form seed trenches that are spaced a corresponding distance apart that is suitable for the type of seed being planted.

Typically a pair of gauge wheels are disposed adjacent the outer surfaces of the seed trench-opening device. The height of the gauge wheels relative to the seed trench-opening device generally is set by the user, which thereby predetermines the depth of the seed trench. However, when one of the gauge wheels travels over an obstacle that is elevated with respect to the soil, such as a rock, hard lump of dirt, heavy residue, and the like, the planting unit will rise, thereby decreasing the seed trench depth. If the planting unit is traveling at a sufficient speed, the planting unit may become momentarily airborne, thereby further lifting the seed trench-opening device out of the ground.

It should be appreciated that a crop yield is maximized when all seeds emerge from the soil within a given timeframe relative to each other. Otherwise, if some seeds emerge later than others in a given row, the yield for that row can be substantially reduced. One known method for encouraging uniform seed emergence is to maintain the seed trench a constant depth when performing seed planting operations. Some planting units include a bracket that links the pair of gauge wheels. Accordingly, when one gauge wheel travels over an obstacle, the opposing gauge wheel to lower and maintain contact with the soil, thereby decreasing the seed trench depth by a distance equal to one-half the height of the obstacle. Conversely, when one of the gauge wheels travels over a depression, the opposing gauge wheel is raised an equal distance, thereby increasing the seed trench depth by a distance equal to one-half the depth of the depression. Such a system is described in U.S. Pat. No. 4,423,788.

While the above system has proved suitable for its intended purpose, it would be desirable to provide a method and apparatus for further reducing the change in seed trench depth when traveling over an obstacle or in a depression while performing seed planting operations.

SUMMARY OF THE INVENTION

In accordance with one aspect of the present invention, a seed planting unit includes a planting frame. The frame carries A) a seed trench opening assembly including a seed trench forming member operable to create a seed trench in a ground surface, B) a seed delivery assembly delivering seeds into the seed trench, and C) a seed trench closing assembly operable to close the seed trench. The planting unit further includes a planting unit support assembly including A) a pair of opposing gauge wheels in mechanical communication with the frame, and B) a rear press wheel assembly in mechanical communication with the gauge wheels. A vertical displacement of the gauge wheel or press wheels in a first direction produces a biasing force on the other of the gauge and press wheel in a direction opposite the vertical displacement.

The foregoing and other aspects of the invention will appear from the following description. In the description, references are made to the accompanying drawings which form a part hereof, and in which there is shown by way of illustration, and not limitation, a preferred embodiment of the invention. Such embodiment does not necessarily represent the full scope of the invention, however, and reference must therefore be made to the claims for interpreting the scope of the invention.

BRIEF DESCRIPTION OF THE DRAWINGS

Reference is hereby made to the following figures in which like reference numerals correspond to like elements throughout, and in which:

FIG. 10 is a side elevation view of the planting unit illustrated in FIG. 2 as the planting unit travels over the obstacle;

FIG. 11 is an end elevation view of the seed trench opening assembly of the planting unit taken along the line 11-11 of FIG. 2;

FIG. 12 is an end elevation view of the seed trench opening assembly of the planting unit along the line 12-12 of FIG. 10;

FIG. 13 is a side elevation view of a planting unit constructed in accordance with an alternate embodiment of the invention;

FIG. 14 is a side elevation view of a planting unit constructed in accordance with another alternate embodiment of the invention;

FIG. 15 is a sectional side elevation view of a rear press wheel adjustment mechanism taken along the line 15-15 of FIG. 14;

FIG. 16 is a top plan view of the rear press wheels constructed in tandem in accordance with an alternate embodiment of the invention;

FIG. 17 is an end view of the rear press wheels illustrated in FIG. 16 as they approach an obstacle; and FIG. 18 is a view similar to FIG. 17 as one of the press wheels travels over the obstacle.

DETAILED DESCRIPTION OF THE PREFERRED EMBODIMENT

Figure 1:
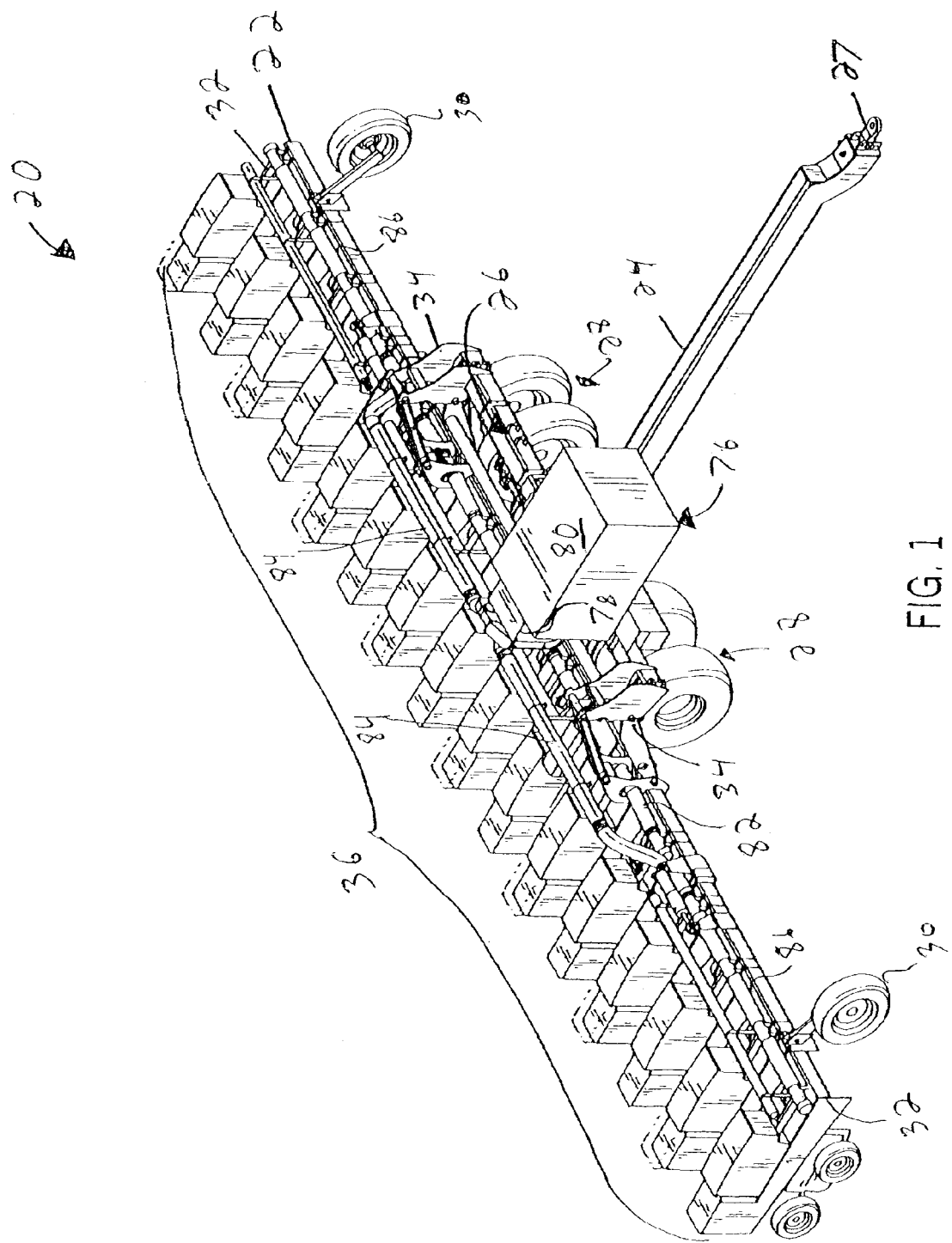
FIG. 1 is a schematic perspective view of a seed planting assembly supporting a plurality of seed planting units constructed in accordance with the preferred embodiment of the invention.

Referring to FIG. 1, a seed planting assembly 20 includes a laterally extending tool bar 22 connected at its middle to a forwardly extending tow bar 24. Tow bar 24 includes a connector 27 disposed at its longitudinally forward end and configured to mate with a corresponding hitch, or the like, of a towing tractor (not shown). Tool bar 22 is supported by a chassis 26 that is connected to tow bar 24 via a bracket assembly 34. Chassis 26 is supported on the ground by two pair of inner wheels 28 disposed on opposite sides of tow bar 24, and a pair of outer wheels 30 disposed proximal the opposing laterally outer ends 32 of tool bar 22.

A plurality of seed planting units (or row units) 36 extends longitudinally rearwardly from tool bar 22. In particular, referring also to FIG. 2, each planting unit 36 includes a frame 37 that is connected at its front end 39 to tool bar 22 via a mounting assembly 59. Mounting assembly includes a pair of upper support beams 61 (one illustrated) and a pair of lower support beams 63 (one illustrated) that are hingedly connected to frame 37 at one end, and to a mounting structure 55 at another end. Mounting structure 55 is, in turn, connected to tool bar 22. Support beams 61 and 63 thus enable planting unit 36 to be raised and lowered without changing the orientation of the planting unit.

As is well-known in the art, planting units 36 are mounted in a side-by-side (lateral) relation relative to each other along the tool bar 22. While sixteen such row units are illustrated in FIG. 1, the present invention contemplates that up to thirty-one row units or more can be typically assembled on a single tool bar 22 in accordance with the preferred embodiment. During operation, forward movement of the tractor causes row units 36 to ride along the ground, forming a plurality of seed trenches that receive seeds and are subsequently closed.

Figure 2:
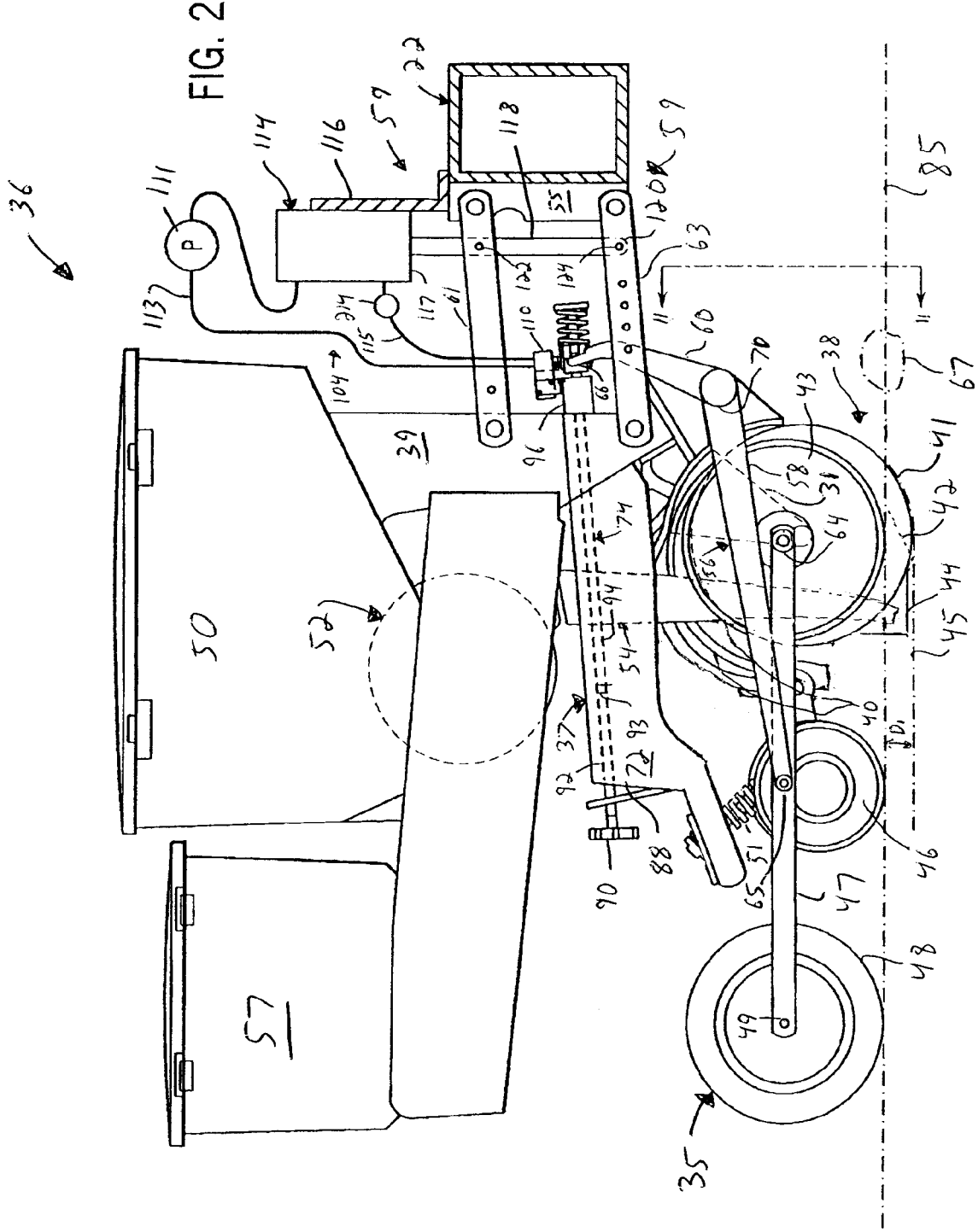
FIG. 2 is a side elevation view of a planting unit illustrated in FIG. 1 constructed in accordance with the preferred embodiment of the invention as it approaches an obstacle.

Referring to FIG. 2 in particular, each planting unit 36 preferably includes a conventional seed trench opening assembly 38, each of which including a pair of laterally spaced seed trench opener discs 40 that converge forwardly and downwardly to define a convergence point 41 that creates a seed trench 45 planting unit 36 travels along the ground 85. As illustrated in FIG. 2, seed trench 45 has a depth D1 that is defined herein as a desired seed trench depth. Opener discs 40 are rigidly mounted to frame 37 via bracket 31. A pair of gauge wheels 43 is provided that are spaced laterally outwardly on either side of opener discs 40. Gauge wheels 43 rotate about hub 64 as planting unit 36 travels along the ground 85.

Each planting unit 36 further includes a seed trench firming point 42 disposed rearwardly from convergence point 41. An opener shoe 44 is disposed rearwardly from firming point 42. Opener shoe 44 and firming point 42 can be integrally connected to each other. Firming point 42 extends slightly downwardly with respect to the opener shoe 44, and helps create and define a trench in the middle of the seed trench 45 formed by opening discs 40. Alternatively, the planting unit 36 can be provided with a runner opener type, or alternative opener apparatus, suitable for providing a seed trench in the ground as is appreciated by one having ordinary skill in the art. Planting unit 36 further includes a pair of spring-loaded seed-trench closer discs 46 disposed rearwardly from opener shoe 44. A press wheel assembly 35 can include one or more press wheels 48 (preferably a pair of press wheels as illustrated in FIG. 16), and is disposed rearwardly from closer discs 46. The press wheels 48 rotate as planting unit 36 travels along ground 85. Press wheels 48 and closer discs 46 are biased against the ground 85 by spring 51.

Planting unit 36 further includes a seed hopper 50 that provides storage for seed material that is to be gravitationally deposited into the seed trench that is formed as the seed trench opening assembly moves across the field during operation. It should be appreciated, however, that a hopper container, smaller than container 50, can alternatively be connected to a centralized bin or large hopper in a conventional manner. In the illustrated embodiment, seeds are delivered from hopper 50 to a seed metering assembly 52 that acts under vacuum pressure to deliver the seeds into a seed tube 54 at a uniform rate. Seed tube 54 defines a conduit having an outlet end immediately downstream of opener shoe 44 and upstream of seed trench closer discs 46. Seed tube 54 thus receives seeds from metering assembly 52 and defines a substantially vertical passage through which the seeds are delivered into the seed trench, and preferably the trench formed by opener shoe 44. The components of seed metering assembly 52 are further described in U.S. Pat. No. 6,109,193, the disclosure of which is hereby incorporated by reference.

A tandem wheel arm 47 extends between each gauge wheel 43 and press wheel assembly 35 that mechanically links the front gauge wheels 43 with the rear press wheels 48. In particular, the front end of wheel arm 47 is connected to the outer surface of gauge wheel at gauge wheel hub 64. Arm 47 extends rearwardly from the front end, and defines a rear end that is connected to press wheel assembly 35 at press wheel hub 49.

Figure 3:
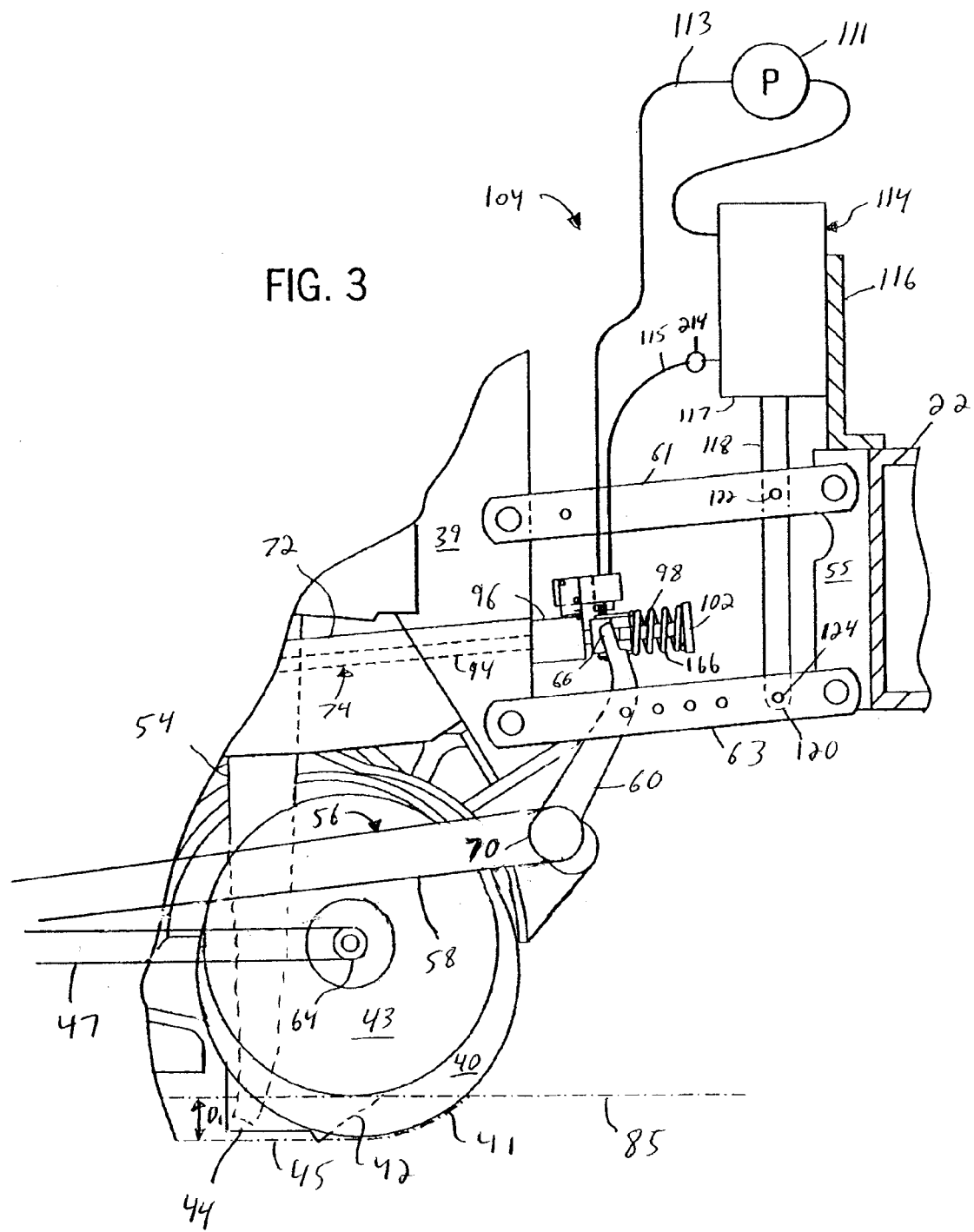
FIG. 3 is a side elevation view of the planting unit illustrated in FIG. 2 showing an enlarged view of the down pressure assembly and seed trench opening assembly.

Referring also to FIG. 3, tandem wheel arm 47, and therefore gauge wheels 43 and press wheel 48, is connected to planting unit frame 37 via a gauge wheel arm 56. Gauge wheels 43 and press wheel assembly 35 are thus suspended independently of opener discs 40. Each gauge wheel arm 56 includes a lower segment 58 that is pivotally connected to the middle of press wheel 48 at a joint 65. Gauge wheel arm 56 further includes an upper segment 60 defining an upper gauge wheel arm end 66. Upper segment 60 is integrally connected to lower segment 58 at an elbow 70 that defines a fixed angle between lower and upper segments 58 and 60. Elbow 70 is pivotally mounted onto frame 37. Vertical translation of gauge wheels 43 or press wheel 48 relative to frame 37 causes the tandem wheel arms 47 and corresponding gauge wheel arms 56 to pivot about elbow 70, thereby causing the upper ends 66 to translate forwardly and rearwardly.

Referring also to FIG. 3, tandem wheel arm 47, and therefore gauge wheels 43 and press wheel 48, is connected to planting unit frame 37 via a gauge wheel arm 56. Gauge wheels 43 and press wheel assembly 35 are thus suspended independently of opener discs 40. Each gauge wheel arm 56 includes a lower segment 58 that is pivotally connected to the middle of tandem wheel arm 47 at a joint 65. Gauge wheel arm 56 further includes an upper segment 60 defining an upper gauge wheel arm end 66. Upper segment 60 is integrally connected to lower segment 58 at an elbow 70 that defines a fixed angle between lower and upper segments 58 and 60. Elbow 70 is pivotally mounted onto frame 37. Vertical translation of gauge wheels 43 or press wheel 48 relative to frame 37 causes the tandem wheel arms 47 and corresponding gauge wheel arms 56 to pivot about elbow 70, thereby causing the upper ends 66 to translate forwardly and rearwardly.

Planting unit 36 can also be equipped with a pesticide hopper 57 that is mounted towards a rear end of the planting unit. Hopper 57 preferably includes an insecticide and/or herbicide, and is provided with conventional dispensing apparatus for applying controlled amounts of insecticide where desired in combination with the planting of seeds by each planting unit 36.

Referring again to FIG. 1, each planting unit 36 can be coupled to an air moving system 76 that includes one or more air moving units (collectively identified as 78) enclosed in one or more housings (collectively identified as 80). While air mover unit(s) 78 are configured to provide negative pressure, they can alternatively function as blower units if a positive pressure seed metering assembly is implemented in planting units 36. Air moving system 76 includes a lower lateral tubing member 82 that is connected at its middle to one of the air moving units 78, and extends laterally outwardly therefrom in both directions. A plurality of openings (not shown) are formed in tubing member 82 that connect to a forward end of a corresponding plurality of flexible intake tubes that, in turn, connect with the corresponding metering assembly 52.

A bifurcated arrangement is illustrated with respect to a pair of upper lateral tubing members 84 that are connected at their laterally inner ends to one or more air mover units 78. Tubing members 84 extend parallel to, and are disposed above, tubing member 82, and are connected at their outer ends to outer tubing members 86. Outer tubing members 86 are vertically aligned with lower tubing member 82, and extend across those planting units 36 that are disposed laterally outwardly with respect to lower tubing member 82. A plurality of openings (not shown) are formed in tubing members 86 that connect to a plurality of flexible intake tubes that, in turn, connect with the metering assemblies 52 of laterally outwardly disposed planting units 36.

During operation, air moving units 78 draw air through the metering assemblies 52 of all planting units 36 to which the lateral tubes 82-86 are operably connected. The number of air mover units 78 implemented in a given seed planting assembly depends largely on the number of planting units 36 and the airflow rating of each air mover unit.

Referring now to FIGS. 2 and 3, planting unit frame 37 includes a central longitudinally extending column 72 that houses a tension bar 74 that extends generally along the entire length of column 72. Tension bar 74 includes a cylindrical member 92 extending forwardly from the rearward end 88 of column 72. Member 92 is threadedly connected to rearward end 88. The forward end of member 92 is rotatably connected to a plate 93 which is, in turn, connected to a pair of laterally spaced parallel links 94 that flank seed delivery tube 54, and are connected at their forward ends to a rectangular housing 96 which extends longitudinally forwardly of column 72. Housing 96 is connected at its forward end to a cylindrical member 98, which defines the forward end of tension bar 74. Cylindrical member 98 defines a threaded forward end 101 that is inserted into a threaded aperture 100 that extends longitudinally through a rectangular plate 102 to provide a terminal stop (See also FIG. 4).

A depth adjustment knob 90 extends rearwardly from the rearward end 88 of column 72, and is attached to tension bar 74. Accordingly, depth adjustment knob 90 can be actuated clockwise and counterclockwise to translate all components of tension bar 74 forwardly and rearwardly, respectively. Longitudinal translation of tension bar 74 adjusts the desired depth of seed trench 45, as will be described in more detail below. Knob 90 can be actuated manually, or alternatively can be connected to an actuator that is controlled electronically from within the tractor or other towing implement. The present invention contemplates several alternative geometric variations of tension bar 74 that enables forward and rearward translation. For instance, knob 90 could alternatively be positioned at the forward end 39 of planting unit frame 37.

Referring to FIG. 3 in particular, planting unit 36 includes an automatic down pressure assembly 104 for automatically adjusting the down pressure acting against frame 37 as the planting unit travels between areas of different ground hardness during operation. In particular, assembly 104 includes a valve 110 that is actuated by forward and rearward movement of upper gauge wheel arm ends 66. Valve 110 includes a port 107 (see FIG. 4) that is connected to a compressed air source 111 (such as an air compressor or charged air reservoir) via a conduit 113. Valve 110 further includes a second port 109 that is connected to a spring member 114 via a conduit 115. Air source 111 is preferably centrally mounted onto tool bar 22, and provides compressed air to one or more row units 36. Alternatively, air source 111 could be provided by the air braking system of the tractor (not shown) that tows planting assembly 20 during operation. Spring member 114 is fastened to a mounting bracket 116, which extends upwardly from mounting structure 55. It should thus be appreciated that spring member 114 is connected to, and grounded at, tool bar 22. However, the present invention envisions alternative constructions for connecting spring member 114 to tool bar 22, either directly or indirectly. The present invention further contemplates that source 111 can alternatively provide any fluid capable of inflating and deflating spring member 114, as appreciated by one having ordinary skill in the art.

Spring member 114 defines a bottom surface 117 that is connected to a downwardly extending piston 118. Piston 118, in turn, is pivotally connected to lower link 63 at a lower piston end 120. Piston 118 is further connected to upper link 61 at a location between lower end 120 and bottom surface 117. In particular, a pair of apertures 122 and 124 extends laterally through links 61 and 63, respectively.

A pin or other suitable fastener extends through apertures 122 and 124, along with mating apertures (not shown) extending through piston 118. Spring member 114 is mounted to bracket 116 in such a way to allow bottom surface 117 to translate vertically downwardly and upwardly as the pressure inside spring member 114 increases and decreases, respectively. Spring member 114 is thus also referred to herein as a fluid spring, as the internal spring pressure is varied as fluid is delivered to, and removed from, the spring member.

Figure 4:
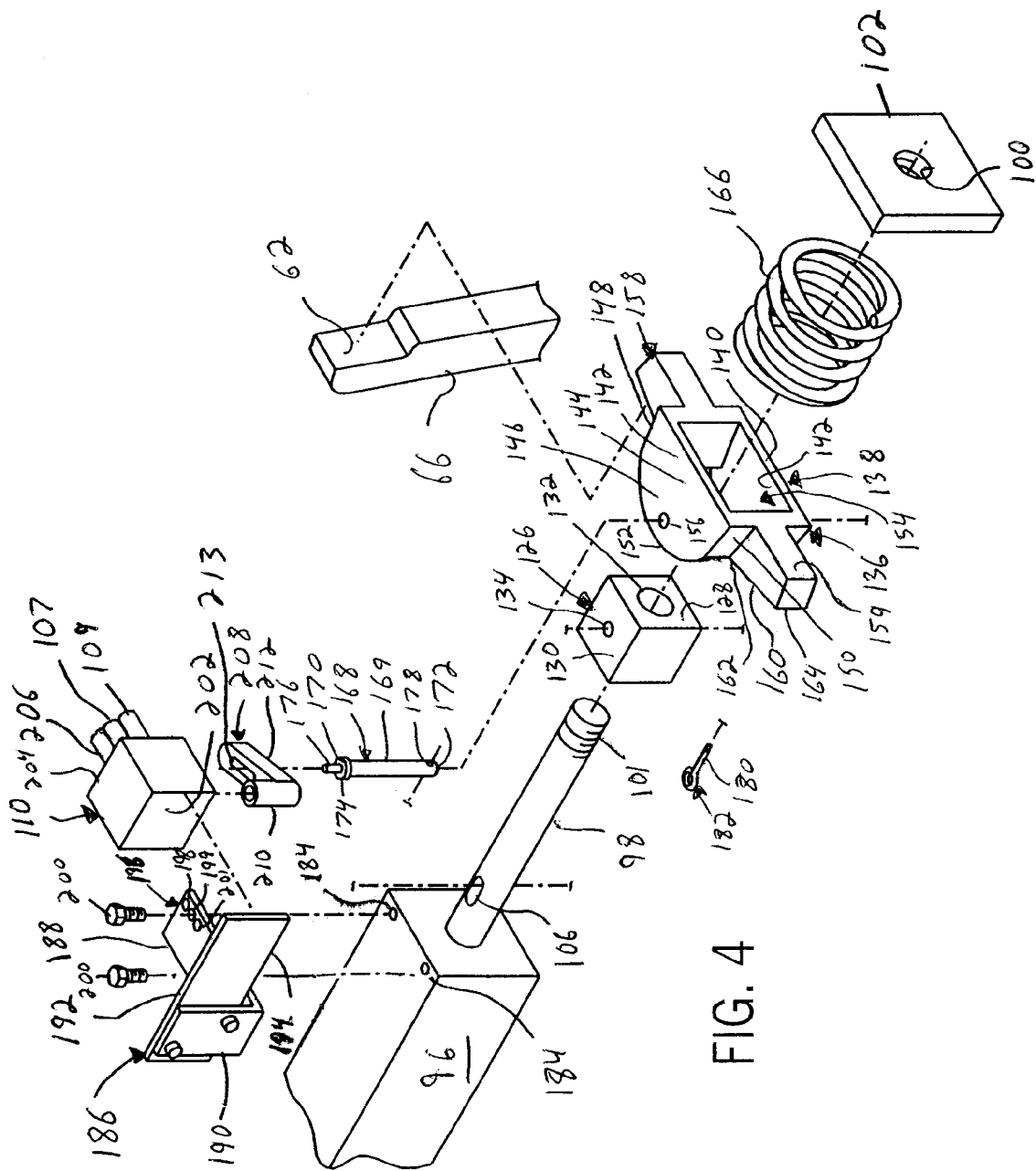
FIG. 4 is an assembly view of components of the down pressure assembly illustrated in FIG. 3.
Figure 5:
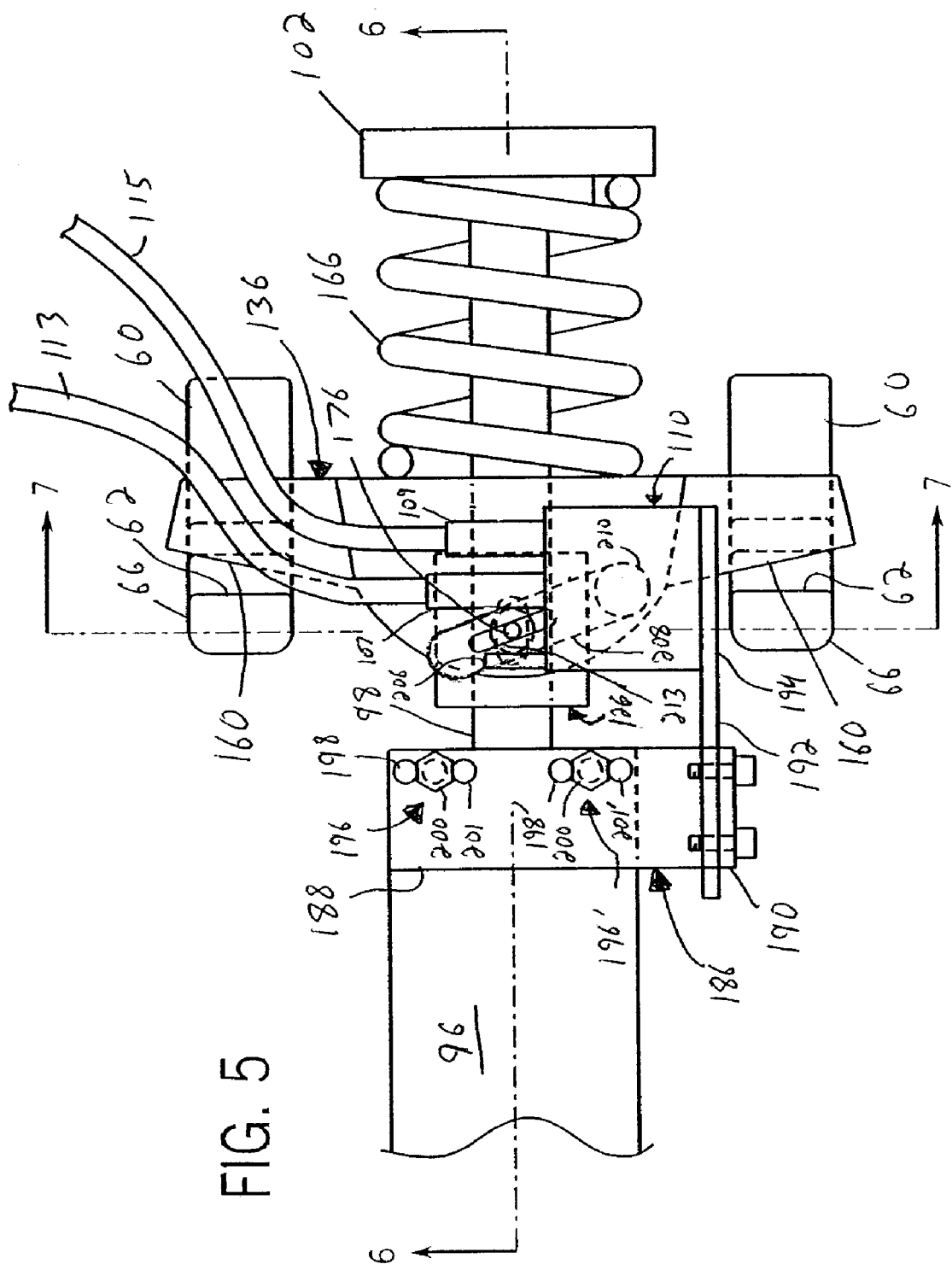
FIG. 5 is a top plan view of the assembled down pressure assembly illustrated in FIG. 4.

Referring now to FIG. 4 in particular, a longitudinally elongated groove 106 extends vertically through cylindrical member 98 at a location proximal housing 96. A square housing 126 defines a pair of longitudinally opposing end walls 128 and opposing upper and lower walls 130. An aperture 132 extends longitudinally through end walls 128, and defines a diameter that is larger than the diameter of cylindrical member 98. Housing 126 further defines an aperture 134 extending vertically through upper and lower walls 130. Aperture 134 has a diameter that is less than the lateral thickness of elongated groove 106.

A wobble bracket 136 includes a central hub 138 that defines a laterally extending front end wall 140. Opposing upper and lower walls 142 extend rearwardly from end wall 140, and include a forward rectangular section 144 integrally connected to a rearwardly disposed arced section 146. A side wall 148 extends along the periphery of walls 142 to join opposing laterally outer ends of end wall 140. Side wall 148 thus also defines opposing rectangular portions 150 and an arced portion 152 connecting rectangular portions 150. Arced portion 152 provides a convex surface with respect to the longitudinally rearward end of bracket 136.

A void 154 having a rectangular cross-section extends longitudinally through front end wall 140 and arced side wall 152. Void 154 is sized to loosely receive housing 126. A cylindrical aperture 156 extends vertically through the arced sections 136 of upper and lower walls 142. Aperture 156 has a diameter substantially equal to the diameter of aperture 134. A pair of wings 158 extends laterally outwardly from rectangular portions 150 of side wall 148. Each wing 158 includes a leading edge 159 that extends laterally outwardly from side wall 148. A trailing edge 160 is disposed rearwardly from leading edge 159, and is angled forwardly from a first end 162 proximal side wall 148 to a distal end 164.

A void 154 having a rectangular cross-section extends longitudinally through front end wall 140 and arced side wall 152. Void 154 is sized to loosely receive housing 126. A cylindrical aperture 156 extends vertically through the arced sections 152 of upper and lower walls 142. Aperture 156 has a diameter substantially equal to the diameter of aperture 134. A pair of wings 158 extends laterally outwardly from rectangular portions 150 of side wall 148. Each wing 158 includes a leading edge 159 that extends laterally outwardly from side wall 148. A trailing edge 160 is disposed rearwardly from leading edge 159, and is angled forwardly from a first end 162 proximal side wall 148 to a distal end 164. Referring now also to FIGS. 5-8, down pressure assembly 104 is assembled by at least partially inserting housing 126 into void 154 through arced portion 152 of side wall 148, such that end walls 128 extend parallel to front end wall 140 and perpendicular to rectangular sections 150 of side wall 148. Housing 126 is inserted until aperture 134 is in alignment with aperture 156. Housing 126 is then mounted onto cylindrical member 98 by sliding the housing 126 rearwardly such that front end 101 extends through aperture 132 formed in rear wall 128. Housing 126 is further slid rearwardly along cylindrical member 98 until apertures 134 and 156 are aligned with groove 106.

A pin 168 is provided including a cylindrical shaft 169 that defines an upper end 170 and a lower end 172, and has a diameter slightly less than the diameter of apertures 134 and 156. Pin includes an annular shoulder 174 extending radially outwardly from upper end 170. The outer diameter of shoulder 174 is greater than the diameter of apertures 134 and 156. An arm 176 extends vertically upwardly from upper end 170, and thus extends upwardly beyond shoulder 174. A keyhole 178 extends radially through lower end 172, and is sized to receive the shaft end 180 of a key 182.

During installation, the lower end 172 of pin 168 is inserted through aperture 156 in upper wall 142, and subsequently through aperture 134 in upper wall 130. Pin 168 is slid downwardly until lower end extends through groove 106, and apertures 134 and 156 in lower walls 130 and 142, respectively, until key hole 178 emerges from lower wall 142. Shoulder 174 abuts upper wall 142 to prevent pin 168 from being inserted completely through bracket 136. Shaft 180 is then inserted into key hole 178 to lock the pin 168 in position. Shaft 180 may be locked in keyhole 178 by any method known in the art. The permissible longitudinal travel of wobble bracket 136 is limited by the longitudinal length of groove 106.

Figure 9:
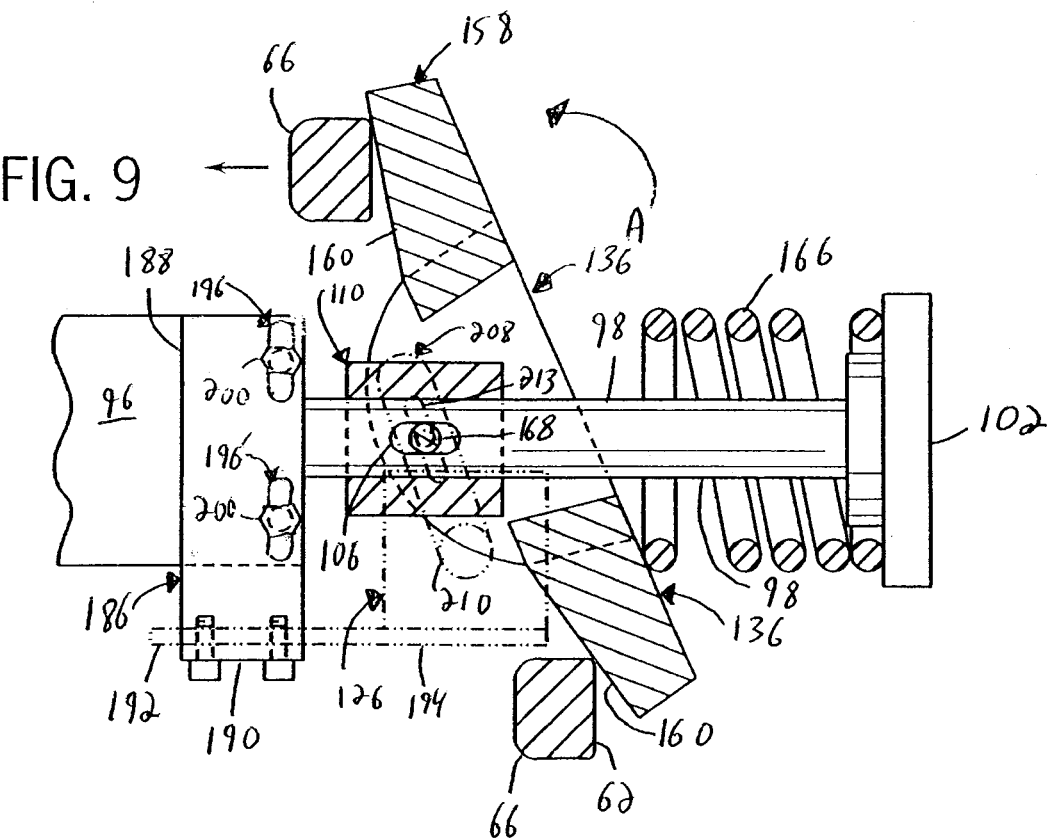
FIG. 9 is a sectional side elevation view similar to FIG. 8, but illustrating an offset gauge wheel position.

Void 154 is sized larger than housing 126 by a predetermined amount so as to enable bracket 136 to pivot clockwise and counterclockwise about pin 168. In accordance with the preferred embodiment, bracket 136 is permitted to pivot 35° equally back and forth (for a total travel of 70°), though any angle of travel between 0° and 180° is contemplated by the present invention. For instance, referring to FIGS. 8 and 9, during operation on level terrain, both upper ends 66 exert the same force on trailing edges 160, thereby preventing rotation of wobble bracket 136. However, when one of the gauge wheels 43 (the right gauge wheel 43 as illustrated) travels over an obstacle 67 (See FIG. 10) that is elevated with respect to the terrain under the opposing gauge wheel, the corresponding arm 47 will rise, thereby causing upper end 66 to translate forwardly, and the opposing upper end 66 to translate rearwardly, as described above. The motion of right upper end 66 causes bracket 136 to rotate counterclockwise in the direction of Arrow A. The opposing force of left upper end 66 reduces the relative vertical translation of gauge wheels 43, and furthermore prevents actuation of valve 110 in response to the forward motion of only one upper end 66.

Spring 166 is then slid rearwardly over the forward end 101 of cylindrical member 98 until the rear face of spring 166 abuts front face 140. Plate 102 is then threadedly inserted onto the forward end 101 of cylindrical member 98 by rotating plate 102 in a clockwise direction (taken from a rearward view of plate 102). Plate 102 is inserted until the forward end of spring 166 engages plate 102, and the rearward end of spring 166 engages forward end wall 128. Plate is then continuously inserted until spring 166 is sufficiently compressed. It should thus be appreciated that spring 166 resists forward translation of bracket 136.

Each gauge wheel arm 56 is laterally and vertically aligned with wings 136. The upper end 66 of each gauge wheel arm 56 extends substantially vertically upwardly, and defines a flat surface 62 that is recessed and configured to abut trailing edge 160 of each wing. Accordingly, as a given gauge wheel 43 is raised and lowered relative to the opposite gauge wheel 43 during operation, for instance as planting unit 36 travels over uneven terrain, the corresponding upper end 66 will travel forwardly and rearwardly with respect to the opposite upper end 66. The upper end movement forces wobble bracket 136 to pivot about pin 168. The angular compliance of bracket 136 reduces the seed trench depth variance during a planting operation. Furthermore, upward translation of gauge wheels 43 relative to frame 37 is permitted, though resisted, by spring 66, which directly resists forward translation of bracket 136. Downward translation of gauge wheels 43 relative to frame 37 biases surfaces 62 rearwardly away from trailing edges 160, thereby allowing spring 166 to bias wobble bracket 136 rearwardly against surfaces 62.

As described above, depth adjustment knob 90 is rotatable clockwise or counterclockwise to translate cylindrical member 98 towards or away from front 39 of frame 37. When member 98 is translated towards front of frame 37, wobble bracket 136 is biased towards spring 166, thereby enabling gauge wheel arm ends 66 to translate forwardly, thereby raising gauge wheels 43. When gauge wheels 43 are raised, seed trench firming point 42 is lowered relative to the gauge wheels, which increases the depth of seed trench 45. Likewise, when member 98 is translated away from the front end 39 of frame 37, the spring force biases bracket 136 rearwardly, thereby lowering the gauge wheels 43 and raising the seed trench firming point 42 relative to the gauge wheels which, in turn, decreases the depth of seed trench 45. Once set, the seed trench 45 has a desired depth D1 when the gauge wheels 43 ride along the ground under a predefined vertical force (down pressure) that maintains ground contact, but is not excessive, which forces gauge wheels 43 into the ground, thus unnecessarily compacting the soil adjacent the seed trench 45.

Figure 6:
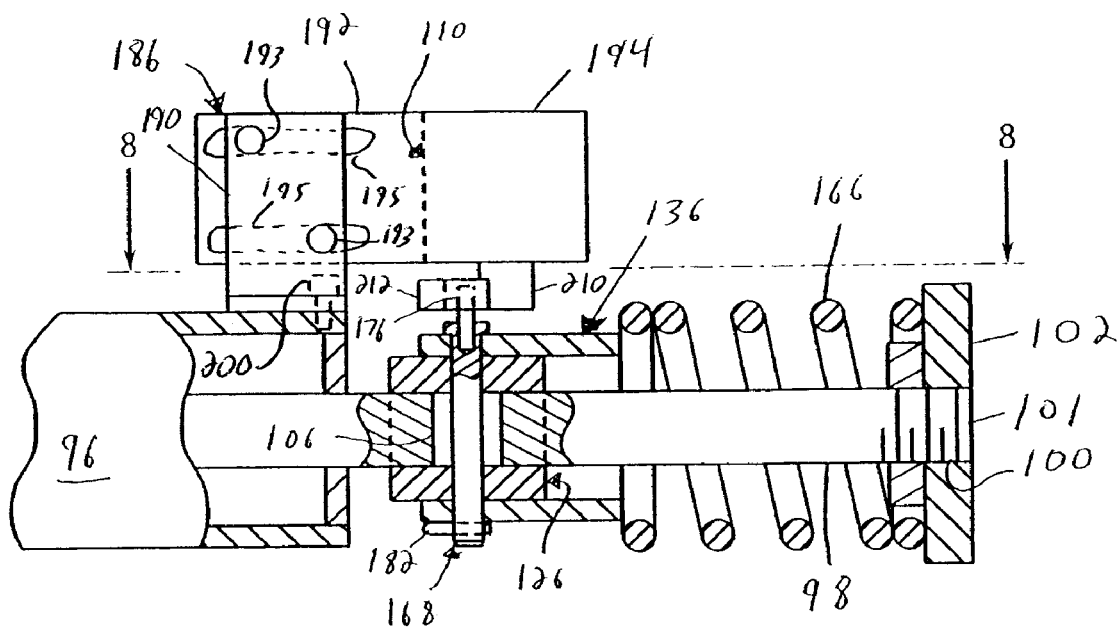
FIG. 6 is a sectional side elevation view of the down pressure assembly taken through line 6-6 of FIG. 5.
Figure 7:
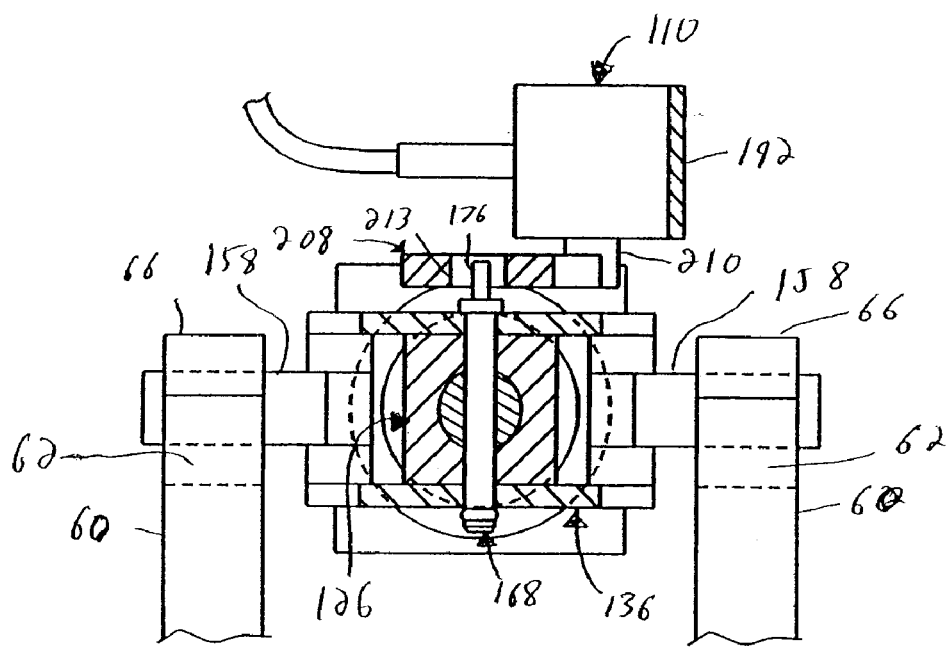
FIG. 7 is a sectional side elevation view of the down pressure assembly taken through line 7-7 of FIG. 5.
Figure 8:
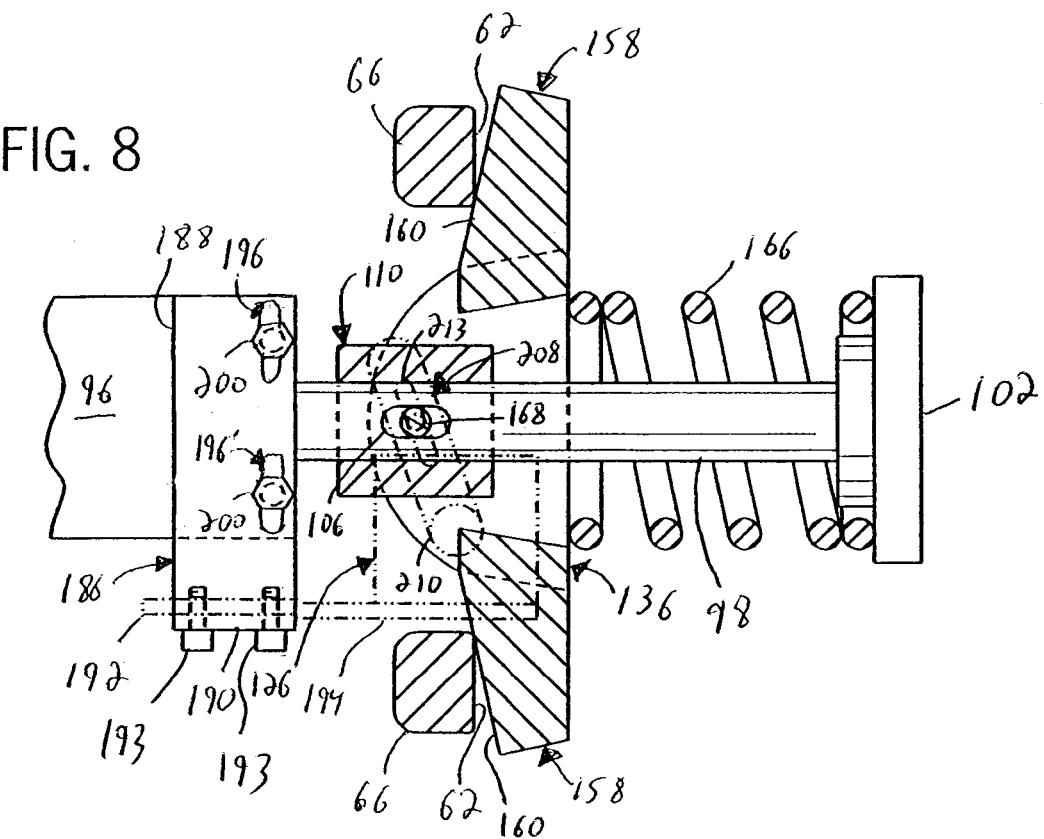
FIG. 8 is a sectional elevation view of the down pressure assembly taken through line 8-8 of FIG. 6 illustrating a neutral gauge wheel position.

A pair of laterally spaced apertures 184 extend vertically downwardly into the front end of housing 96. Apertures 184 are laterally spaced so as to be positioned at opposite lateral ends of housing 96. A valve mounting bracket 186 is provided having a base 188 that extends laterally in a horizontal orientation. Base 188 is integrally connected to a side wall 190 that extends vertically upwardly from one lateral end of base 188. A support wall 192 is also provided that extends forwardly in a vertical orientation, and is connected at its rearward end to side wall 190 via screws 193. A portion 194 of support wall 192 thus extends forwardly with respect to base 188. Referring to FIG. 6, screws 193 can be mounted in any position along corresponding longitudinally extending slots 195 that are formed in support wall 192. The longitudinal position of bracket 186 (and hence valve 101) is thus adjustable, thereby enabling a user to preset the down pressure applied to frame 37 and gauge wheels 43, as will become apparent from the description below.

Referring again to FIGS. 5-8, the lateral position of bracket 186 (and hence valve 101) is also adjustable. In particular, a first elongated slot 196 extends through base 188 and are positioned proximal the front edge of base 188 at the laterally outer edge that is opposite side wall 190. A second elongated slot 196' is disposed proximal the front end of base 188 (forwardly aligned with slot 96) and is disposed proximal side wall 190. The two slots are displaced from each other a distance equal to the distance between apertures 184. A pair of screws 200 are provided that can be inserted through slots 196 and 196' and threadedly inserted into apertures 184. Accordingly, the lateral position of bracket 186 is adjustable by mounted the bracket in any position accommodated by slots 196 and 196'.

Valve 110 includes a first proximal side wall 202 that is mounted onto the laterally inner surface of side wall 190 by any suitable attachment mechanism. A second distal side wall 204 is disposed opposite side wall 202. Conduits 113 and 115 extend outwardly from side wall 202 and connect to air source 111 and spring 114, as described above, along with an outlet 206 to the ambient environment.

A valve arm 208 is provided having a cylindrical neck 210 that extends upwardly from a horizontal arm 212. Neck 210 extends into the bottom of valve 110 such that arm 212 extends horizontally outwardly from neck 210 below valve 110. A horizontally elongated groove 213 extends vertically through arm 212, and is sized to receive arm 176 of pin 168. When valve 110 is installed on mounting bracket 186, and when bracket 186 is mounted onto housing 96, arm 176 extends laterally outwardly from neck 210 in a direction opposite side wall 190. Arm 176 is translated longitudinally forwards and backwards during operation, thereby causing valve arm 212 to pivot clockwise and counterclockwise, respectively, (from a downward view) about neck 210 during operation to control fluid flow through valve 110, as will be described in more detail below.

Valve 110 is a variable flow valve, and can be of the type described in U.S. Pat. No. 4,726,571, the disclosure of which is hereby incorporated by reference as if set forth in its entirety herein. Alternatively, a skilled artisan will appreciate that valve 110 can be of any suitable construction capable of operating as described herein. In a first mode, when valve arm 208 is in a neutral, pivotally centered position, flow in and out of ports 113 and 115 is blocked. Accordingly, when the valve is connected to source 111 and spring 114 in the manner described above, flow from source 111 is blocked from travelling to spring 114, and air in spring 114 is prevented from flowing through valve 110 and into the ambient environment through outlet 206.

In a second mode, when valve arm 208 is rotated clockwise (from a view looking down), port 107 continues to be blocked, but port 109 is coupled to outlet 206. Accordingly, air is permitted to flow from spring 114 into the ambient environment via outlet 206. It should be appreciated that removing air from spring 114 reduces the spring pressure and correspondingly reduces the downward force (down pressure) that the air spring 114 exerts on frame 37. Because valve 110 is a variable flow valve, the flow rate of air through the valve 110 from spring 114 will increase as arm 208 is pivoted clockwise.

In a third mode, when valve arm 208 is rotated counter-clockwise (from a view looking down) from the neutral position, port 109 is blocked, but port 107 is linked to port 109, thereby permitting air to flow from source 111 through valve 110 and into spring 114. It should be appreciated that increasing airflow into the spring 114 increases the spring pressure, and correspondingly increases the downward force that spring 114 exerts on frame 37. Because valve 110 is a variable flow valve, the flow rate of air travelling from source 111, through valve 110, and to spring 114 will increase as arm 208 is pivoted counterclockwise.

As described above, the position of bracket 186 (and hence valve 110) is adjustable in the lateral direction. For instance, when bracket 186 is mounted in the innermost lateral position (i.e., screws 200 are disposed towards wall 192), arm 176 engages groove 213 at a location proximal neck 210. The location of arm 176 engagement with groove 213 moves laterally away from neck 210 as bracket 186 is mounted in positions laterally outwardly from the innermost lateral position. It should be appreciated that longitudinal translation of pin 168 will cause arm 212 to pivot increasingly as pin 176 engages groove 213 at locations closer to neck 210. Accordingly, valve 110 is most sensitive when mounted in the innermost lateral position described above, and becomes less sensitive as bracket 186 is mounted at positions laterally outwardly from that position. The sensitivity of the automatic pressure system is therefore advantageously adjustable, as will be appreciated from the description below. Because valve 110 is a variable flow valve, the flow rate of air from source 111 to spring 114 will increase as arm 208 is pivoted counterclockwise.

Also, as discussed above, the position of bracket 186 (and hence valve 110) is adjustable in the longitudinal direction. As a result, once knob 90 is actuated to determine the desired seed trench depth, the desired down pressure can be predetermined. In particular, as bracket is mounted in a longitudinally forward position relative to pin 168, valve arm 208 will pivot counterclockwise, thus allowing air to flow from source 111 to spring 114 and increasing the down pressure on frame 37. Conversely, as bracket 186 is mounted in a longitudinally rearward position relative to pin 168, valve arm 208 will pivot clockwise, thus allowing air to flow from spring 114 and decreasing the down pressure.

As discussed above with reference to FIG. 2, it is desirable to maintain the down pressure acting against frame 37 at a level that produces a seed trench 45 having the desired depth. However, when planting unit 36 travels into softer terrain or when the planting unit rate of travel decreases, the down pressure will force the opener discs 40 and gauge wheels 43 to sink deeper into the ground 85 and cause seed trench 45 to have a depth greater than the desired depth. Less down pressure is desired in this situation. Because the upward vertical forces that the ground 85 imparts on the opener discs will decrease in this situation, the upward forces acting on the gauge wheels 43 will increase, thereby causing the upper ends 66 of gauge wheel arms 56 (along with pin 168) to translate forwardly. Valve arm 208 is then rotated clockwise, enabling air to flow from spring 114 into the ambient environment via outlet 206. As air is removed from spring 114, the downward spring force is reduced, thereby reducing the down pressure applied to frame 37 by spring 114.

As the down pressure against frame 37 is reduced, opener discs 40 and gauge wheels 43 begin to rise within the ground 85, thus causing upper ends 66 to translate rearwardly. Valve arm 208 thus pivots counterclockwise towards the neutral position, causing a reduction in the air flowing out of the spring 114. Once the discs 40 and gauge wheels rise to a position such that seed trench 45 has a desired depth D1, the valve arm 208 will be in the neutral position, and the down pressure will be maintained.

Otherwise, when planting unit 36 travels over hard terrain, or travels at faster speeds, opener discs 40 will tend to rise within the ground, thereby causing the planting unit 36 and gauge wheels 43 to rise as well. The trench depth thus becomes less than the desired depth D1. As a result, increased down pressure is required to ensure that sufficient gauging is achieved by gauge wheels in order to create the desired trench depth D1. Gauge wheels 43, which constantly ride along the ground 85 under the force of spring 166, are lowered relative to planting unit frame 37, thereby causing the upper ends 66 of corresponding gauge wheel arms 56 (and pin 168) to translate longitudinally rearwardly under the force of spring 98.

Rearward translation of pin 168 within groove 106 causes valve arm 208 to rotate counterclockwise, thereby coupling ports 113 and 115 and allowing air to flow from source 111 to spring 114. The increased air pressure within spring 114 biases piston 118 downwardly, thereby increasing the down pressure on frame 37. As the down pressure increases, opener discs 40 and gauge wheels 43 will be forced further into the ground, thereby increasing the depth of seed trench 45. The upper ends 66 will thus translate forwardly and valve arm 208 will rotate clockwise towards the neutral position. As arm 208 rotates clockwise, valve 110 will cause the air flow from source 111 to spring 140 to decrease, thereby slowing the rate of opener disc and gauge wheel descent as the seed trench depth approaches the desired depth. Air flow to and from spring 140 will be blocked once the desired down pressure is applied to the frame (and gauge wheels 43), thereby achieving the desired seed trench depth. The valve arm 108 will be in the neutral position based on the previous setting.

It should be appreciated that while the gauge wheels 43 provide a depth regulating member in accordance with the preferred embodiment, the present invention contemplates that any suitable depth regulating member, for example a skid or a plate or the like, that is capable of riding along the ground 85 to regulate trench depth is contemplated by the present invention.

The present invention further recognizes that it may be desirable to regulate the maximum air pressure in spring 114 in order to prevent over pressurization of the spring and subsequent failure. Accordingly, a pressure relief valve (not shown) can be disposed in conduit 115 proximal spring 114 that redirects air from valve 110 to the ambient environment when the pressure within the spring exceeds a predetermined threshold. Pressure relief valves of this type are well known to those having ordinary skill in the art.

Advantageously, valve 110 can include an internal delay system that prevents the valve from changing modes for a predetermined period of time. Accordingly, down pressure on the frame is not adjusted until the seed trench depth has deviated from the desired depth for the period of time. The delay prevents abrupt changes in down pressure when, for instance, the planting unit 36 momentarily travels over obstacle 67 or uneven terrain.

It should be appreciated the down pressure assembly 104 advantageously enables a user to perform planting operations at various speeds and over various terrain while maintaining a constant desired seed trench depth without having to manually adjust the down pressure on the planting unit.

Referring now to FIGS. 10-12, the tandem wheel arm 47 enables reciprocal movement between the press wheel(s) 48 and gauge wheels 43. Furthermore, wobble bracket 136 enables reciprocal movement between gauge wheels 43. Moreover, press wheels 48 can be provided in tandem to enable reciprocal movement between press wheels 48, as is described in more detail below. These reciprocal movement assemblies, both alone and in combination, reduce variations in seed trench depth with respect to conventional planting units 36 when one of the gauge wheels 43 travels over an obstacle 67 having a height H, as will now be described.

In particular, referring also momentarily to FIG. 2, as gauge wheels 43 approach the obstacle 67, opener discs 40 are creating a seed trench 45 at the desired depth D1. However, when one of the gauge wheels 43 (the right gauge wheel 43 as illustrated in FIG. 12) travels over the obstacle 67 having a height H and is thus translated upwardly, arm 47 pivots about joint 65, thereby biasing the corresponding press wheel 48 downwardly a distance equal to H. However, ground 85 does not permit the corresponding press wheel 48 to travel downwardly. Accordingly, because joint 65 is located at the longitudinal midpoint between gauge wheel 43 and press wheel 48, and because press wheel 48 continues to ride along the ground 85, joint 65 is raised a distance equal to ½*H.

When joint 65 is translated upwardly, gauge wheel arm 56 pivots about elbow 70, thereby biasing upper end 66 forwardly a distance corresponding to the ½*H vertical travel of joint 65. The upper end 66 of the left gauge wheel arm 56 is thus biased rearwardly by wobble bracket 136 which biases the left joint 65 downwardly a distance equal to ½*H.

However, ground 85 prevents the left gauge wheel 43 from traveling downwardly a distance equal to ½*H. As a result, upper ends 66 and wobble bracket 136 are translated forwardly an amount that corresponds to the planting unit being raised a distance of ¼*H, which provides clearance for the opposing gauge wheel 43 to be lowered by a distance equal ¼*H. The cumulative effect of the ¼*H forward movement of wobble bracket 136 and the downwards translation of the opposing gauge wheel of ¼*H offsets the ½*H distance that the right upper end 66 was biased forwardly in response to traveling over obstacle 67. Wobble bracket 136 thus operates as a mechanical linkage in a manner similar to tandem wheel arm 47, except that wobble bracket 136 links the left and right elbows 70, which are connected to the planting unit frame 37. As a result, when the right joint 65 is translated upwardly a distance of ½*H, the wobble bracket 136, which is located at the midpoint between elbows 70, produces an overall upwards translation of planting unit frame 37 (and thus opener discs 40) of ¼*H. Tandem wheel arms 47 thus enable the seed trench 45 to maintain a more constant depth than achieved by conventional planting units.

If, on the other hand, the rear press wheel 48 travels over obstacle 67 having height H, linkage 47 biases both gauge wheels 43 downwardly. However, because ground 85 does not permit downward movement of gauge wheels 43, midpoint 65 is raised a distance equal to ½*H. Because both gauge wheels 43 remain engaged with ground 85 as they are biased downwardly, the wobble bracket 136 does not further reduce the vertical displacement. Accordingly, planting unit frame 37 (and opener discs 40) are raised a distance equal to ½*H.

Referring also to FIGS. 16-18, the present invention contemplates that planting unit 36 illustrated in FIG. 10 can include a press wheel assembly 35 having a pair of press wheels 48 that are rotatably connected to the outer ends of a laterally extending axle 79. While the press wheels 48 are illustrated in a vertical orientation, it should be appreciated that they could alternatively ride along the ground 85 at an angle between 0° and 40° (with the wheels converging in a downward direction) with respect to the vertical orientation illustrated. Alternatively, or in addition, press wheels 48 could converge in a direction from front-to-rear at an angle between 0° and 40°.

A collar 81 is disposed on axle 79, and is positioned midway between the press wheels 48. Collar 81 presents a forward opening 87 that rotatably receives the rearward end of a central arm 83. Arm 83 extends forwardly from collar 81 and is connected to tandem wheel arms 47 at a location longitudinally forward of collar 81. Accordingly, instead of arms 47 being connected to the outer ends of press wheels 48, they could instead converge to the midpoint of axle 79, and engage the axle via collar 81. Accordingly, when one of the press wheels 48 travels over an obstacle 67, the midpoint of axle 79 will raise a distance equal to ½*H. Joint 65 on arm 47 will thus raise a distance equal to ¼*H. Consequently, as described above, the planting unit frame 37 (and opener discs 40) would be raised the same distance as joint 65, ¼*H.

If both press wheels were to travel over obstacle 67 (e.g., a clump of hard dirt), the planting unit frame 37 (and opener discs) would be raised a distance equal to ½*H, as described above. This scenario is unlikely, however, as the obstacle 67 would likely be smashed or displaced by gauge wheels 43.

If one or both of the gauge wheels 43 were to travel over obstacle 67 with press wheel assembly 35 configured as illustrated in FIGS. 16-18, the overall vertical displacement of frame 37 would remain ½*H as described above.

Referring now to FIG. 13, planting unit 36 can provide a mechanical linkage and reciprocal movement between the gage wheels 43 and press wheel assembly in accordance with an alternate embodiment. In particular, tension bar 74 extends axially through frame 37 as described above. In this embodiment, the upper ends 66 of each gauge wheel arm 56 are connected to wobble bracket 136 as described above. However, the lower segment 58 of each gauge wheel arm 56 is connected to the hub 64 of the corresponding gauge wheel 43, as planting unit 36 does not include tandem wheel arm 47. Instead, the rear end of tension bar 74 is connected to press wheel assembly 35 via a bell crank 163, as will now be described.

Press wheel assembly 35 includes a single press wheel 48 that is rotatably connected on either side to a support arm 83. Support arms 83 extend forwardly from press wheel 48 and are pivotally connected to the rear end of planting unit frame 37 at joint 89. A spring 171 is provided having a lower end connected to the longitudinal midpoint of arms 83 via a laterally extending brace (not shown). The upper end of spring 171 is connected to the lower end of an arm 181. Spring 171 provides shock isolation when the press wheel 48 travels over obstacle 67.

A bell crank 163 is provided having a lower end 175 that is pivotally connected to the rear end of tension bar 74. The upper end 177 of bell crank 163 is pivotally connected to frame 37 via a bracket 165 that extends upwardly and rearwardly from the rear end 88 of column 72. The rear end 179 of bell crank 163 is connected to the upper end of arm 181. An optional spring 173 connects the lower end of bell crank 163 to bracket 165, and can be placed in tension to urge the bell crank 163 to rotate counterclockwise about its upper end and causing additional down pressure against press wheel 48, thereby transferring more of the row unit weight to the press wheel 48.

It should be appreciated that upwards translation of press wheel 48 causes arm 181 to translate, thereby rotating bell crank 163 clockwise and translating tension bar 74 rearwardly as will be described in more detail below. Conversely, upwards translation of one of the gauge wheels 43 causes tension bar 74 to translate forwardly, thereby rotating bell crank 163 counterclockwise and biasing press wheel 48 downwardly. The distance that tension bar 74 translates axially relative to the distance that press wheel 48 translates vertically can be controlled by 1) the location on arm 83 that connects with 181, and 2) the geometry of bell crank 163.

For instance, reducing the horizontal distance between linkages 177 and 179 will associate greater bell crank rotation in response to vertical translation of arm 181, thus producing a correspondingly greater translation of tension bar 74. Conversely, increasing the horizontal distance between linkages 177 and 179 will associate less bell crank rotation in response to vertical translation of arm 181, thus producing a reduced translation of tension bar 74. The horizontal distance between linkages 177 and 179 can be empirically optimized to minimize the planting unit height increase in response to the event of a gauge wheel 43 traveling over obstacle 67 and in the event of a press wheel 48 traveling over obstacle 67, as will now be described.

In particular, during operation, when one of gauge wheels 43 of planting unit 36 illustrated in FIG. 13 travels over obstacle 67, wobble bracket 136 tends to lower the opposing gauge wheel 85 a distance equal to H. However, ground 85 does not permit the opposing gauge wheel to lower. Assuming the tension bar 74 did not connect the gauge wheels 43 to press wheel assembly 35, upper ends 66 would be translated forwardly an amount that corresponds to the planting unit being raised a distance of ½*H, while the opposing gauge wheel lowers a distance ½*H. The planting unit 37 (and opener discs 40) would thus be raised a distance equal to ½*H. Such an assembly is further disclosed in U.S. Pat. No. 4,423,788, the disclosure of which is hereby incorporated by reference.

Advantageously, the present invention links the press wheel assembly 35 to the upper ends 66 and wobble bracket 136 via bell crank 163 and tension bar 74. Accordingly, the forward movement of upper ends 66 cause tension bar 74 to translate forwardly, and bell crank 163 to rotate counterclockwise. The press wheel 48 is thus caused to pivot downwardly with respect to joint 89, thereby enabling tension bar 74 to move further forwardly. The geometry of bell crank 136 can be optimized such that half of the total ½*H increase is achieved by the gauge wheels 43 at elbow 70, while the other half of the ½*H increase is achieved by the press wheels at joint 89. The planting unit 37 and opener discs 40 are thus raised vertically a distance of ¼*H at joints 89 and 70.

If the press wheel 48 travels over obstacle 67, arm 83 pivots about joint 89, and is raised at its intersection with arm 181 (or spring 171) a distance slightly less than H. The pivoting of arm 83 causes arm 181 to raise, thereby biasing bell crank 136 to rotate in the clockwise direction about Arrow B. Tension bar 74 is thus translated rearwardly, thereby lowering gauge wheels 43. The optimized geometry of bell crank 163 cause half of the height increase H to be achieved by the press wheel 48, while the other half of the height increase H is achieved by the gauge wheels 43. As a result, the planting unit frame 37, and opener discs, are raised a distance equal to ½*H.

The present invention contemplates that planting unit 36 illustrated in FIG. 13 can include a press wheel assembly 35 having a pair of press wheels 48 as described above with reference to FIGS. 16-18. Accordingly, if one of the rear press wheels 48 of the planting unit 36 of FIG. 10 were to pass over obstacle 67, the vertical position of collar 81 would be increased by a distance equal to ½*H. The height increase of collar 81 would cause arm 83 to pivot about frame 37, thereby raising the arm 83 at its intersection with arm 181 (or spring 171) a distance slightly less than ½*H. The upward translation of arm 181 causes bell crank 163 to rotate clockwise which, in turn, translates tension bar 74 rearwardly. Front gauge wheels 43 are biased downwardly a distance corresponding to the distance that arm 181 was raised. Bell crank 163 and tension bar 74 thus provide a mechanical linkage between the rear press wheels 48 and front gauge wheels 43.

It has been empirically determined that the geometry of bell crank 163 can be optimized to raise planter frame 37 at press wheel and gauge wheel support locations 89 and 70, respectively (and thus raise the planter frame 37 as a whole) a distance substantially equal to ¼*H. The depth of seed trench 45 is thus decreased a distance substantially equal to ¼*H.

It should be appreciated that frame 37 would be raised a distance of ½*H if both press wheels were to travel over obstacle 67 (e.g., raised collection of hard dirt). Such a situation is unlikely, however, as collections of hard dirt would likely be smashed or displaced when passed over by gauge wheels 43.

Referring now to FIGS. 14 and 15, planting unit 36 can include arm 181 that is constructed in accordance with an alternate embodiment. In particular, arm 181 includes an upper segment 183 that is fastened to a lower segment 185. A plurality of apertures 187 extend laterally through lower segment 185 that can be matched with an aperture 189 extending laterally through the lower end of upper segment 183. A pin 191 is inserted through the apertures to control the planting depth of trench 45. The planting unit 36 illustrated in FIG. 14 is vertically displaced as described above when a gauge wheel 43 or press wheel(s) 48 travel over obstacle 67.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A method for reducing seed trench depth variations during operation of a seed planting unit including 1) a planting unit frame that carries i) a seed trench opening assembly including a seed trench forming member operable to create a seed trench in a ground surface, ii) a seed delivery assembly delivering seeds into the seed trench, and iii) a seed trench closing assembly operable to close the seed trench, and 2) a planting unit support assembly including i) first and second opposing gauge wheels in mechanical communication with the frame, and ii) at least one rear press wheel in mechanical communication with the gauge wheels, the steps comprising:

A) causing a vertical displacement of one of the first gauge wheel and the at least one rear press wheel in a first direction relative to the frame;
   C) biasing the other of the first gauge wheel and the at least one rear press wheel in a direction opposite the first direction relative to the frame in response to step (A),
   wherein the gauge wheels are connected to the frame via gauge wheel arms having upper ends that engage opposite ends of a bracket that is pivotally connected to the frame, wherein step (A) further comprises pivoting the bracket to displace the other gauge wheel in the opposite direction, further comprising the step of connecting the at least one rear press wheel to at least one of the gauge wheels via a tandem arm, wherein one of the gauge wheel arms defines a lower end that is connected to the tandem arm, further comprising the step of connecting a press wheel assembly to the bracket via a bell crank that 1) is pivotally connected to the frame at one location, 2) in mechanical communication with a press wheel assembly at a second location, and 3) in mechanical communication with the bracket at a third location.

* * * * *